United States Patent
Ohyama

(10) Patent No.: US 8,957,928 B2
(45) Date of Patent: Feb. 17, 2015

(54) IMAGE FORMING APPARATUS

(75) Inventor: Tatsuo Ohyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 69 days.

(21) Appl. No.: 13/114,478

(22) Filed: May 24, 2011

(65) Prior Publication Data
US 2011/0298883 A1    Dec. 8, 2011

(30) Foreign Application Priority Data

Jun. 4, 2010 (JP) .................................. 2010-129476

(51) Int. Cl.
| B41J 2/415 | (2006.01) |
|---|---|
| B41J 2/435 | (2006.01) |
| B41J 2/47 | (2006.01) |
| B41J 2/455 | (2006.01) |
| G02B 26/12 | (2006.01) |

(52) U.S. Cl.
CPC ........... B41J 2/473 (2013.01); B41J 2/455 (2013.01); G02B 26/123 (2013.01); G02B 26/127 (2013.01)
USPC ............ 347/133; 347/132; 347/236; 347/246

(58) Field of Classification Search
USPC .................................. 347/132, 133, 236, 246
See application file for complete search history.

(56) References Cited

U.S. PATENT DOCUMENTS

| 2009/0052944 A1* | 2/2009 | Kubo et al. .................. 399/220 |
|---|---|---|
| 2009/0091805 A1* | 4/2009 | Tanabe et al. ................ 358/475 |
| 2009/0238591 A1* | 9/2009 | Watanabe et al. ............... 399/51 |
| 2010/0060711 A1* | 3/2010 | Shibuya et al. ............... 347/233 |
| 2010/0239288 A1 | 9/2010 | Ohyama |
| 2011/0063680 A1 | 3/2011 | Ohyama |

FOREIGN PATENT DOCUMENTS

| JP | 2003-182139 | 7/2003 |
|---|---|---|
| JP | 2004-106365 | 4/2004 |
| JP | 2009-40031 | 2/2009 |

* cited by examiner

Primary Examiner — Justin Seo
Assistant Examiner — Kendrick Liu
(74) Attorney, Agent, or Firm — Oblon, Spivak, McClelland, Maier & Neustadt, L.L.P.

(57) ABSTRACT

An image forming apparatus includes a photoconductor, a charger to charge the photoconductor, a multi-beam scanning unit, a development unit, and a transfer unit. The multi-beam scanning unit includes a vertical cavity surface emitting laser as a light source having light emitting elements arrayed in main and sub-scanning directions by setting an interval between light emitting elements adjacently disposed at a center portion of the scanning unit in the sub-scanning direction narrower than an interval between other light emitting elements adjacently disposed at other portions of the scanning unit in the sub-scanning direction, a deflecting element to deflect light emitted from the light emitting elements to scan the surface of photoconductor by an interlace scan, and a light intensity adjustment unit to adjust light intensity of the light emitting elements adjacently disposed at the center portion relative to a light intensity of other light emitting elements adjacently disposed at other portions.

14 Claims, 15 Drawing Sheets

| MAIN SCAN n-1 | MAIN SCAN n | MAIN SCAN n+1 |
|---|---|---|
|  |  |  |
|  | ch1 |  |
| ch22 |  |  |
|  | ch2 |  |
| ch23 |  |  |
|  | ch3 |  |
| ch24 |  |  |
|  | ch4 |  |
| ch25 |  |  |
|  | ch5 |  |
| ch26 |  |  |
|  | ch6 |  |
| ch27 |  |  |
|  | ch7 |  |
| ch28 |  |  |
|  | ch8 |  |
| ch29 |  |  |
|  | ch9 |  |
| ch30 |  |  |
|  | ch10 |  |
| ch31 |  |  |
|  | ch11 |  |
| ch32 |  |  |
|  | ch12 |  |
| ch33 |  |  |
|  | ch13 |  |
| ch34 |  |  |
|  | ch14 |  |

| MAIN SCAN n-1 | MAIN SCAN n | MAIN SCAN n+1 |
|---|---|---|
| ch35 |  |  |
|  | ch15 |  |
| ch36 |  |  |
|  | ch16 |  |
| ch37 |  |  |
|  | ch17 |  |
| ch38 |  |  |
|  | ch18 |  |
| ch39 |  |  |
|  | ch19 |  |
| ch40 |  |  |
|  | ch20 |  |
|  | ch21 |  |
|  |  | ch1 |
|  | ch22 |  |
|  |  | ch2 |
|  | ch23 |  |
|  |  | ch3 |
|  | ch24 |  |
|  |  | ch4 |
|  | ch25 |  |
|  |  | ch5 |
|  | ch26 |  |
|  |  | ch6 |
|  | ch27 |  |
|  |  | ch7 |
|  | ch28 |  |
|  |  | ch8 |

FIG. 4B

| MAIN SCAN n-1 | MAIN SCAN n | MAIN SCAN n+1 | | MAIN SCAN n-1 | MAIN SCAN n | MAIN SCAN n+1 |
|---|---|---|---|---|---|---|
|  | ch29 |  |  |  |  | ch23 |
|  |  | ch9 |  |  |  |  |
|  | ch30 |  |  |  |  | ch24 |
|  |  | ch10 |  |  |  |  |
|  | ch31 |  |  |  |  | ch25 |
|  |  | ch11 |  |  |  |  |
|  | ch32 |  |  |  |  | ch26 |
|  |  | ch12 |  |  |  |  |
|  | ch33 |  |  |  |  | ch27 |
|  |  | ch13 |  |  |  |  |
|  | ch34 |  |  |  |  | ch28 |
|  |  | ch14 |  |  |  |  |
|  | ch35 |  |  |  |  | ch29 |
|  |  | ch15 |  |  |  |  |
|  | ch36 |  |  |  |  | ch30 |
|  |  | ch16 |  |  |  |  |
|  | ch37 |  |  |  |  | ch31 |
|  |  | ch17 |  |  |  |  |
|  | ch38 |  |  |  |  | ch32 |
|  |  | ch18 |  |  |  |  |
|  | ch39 |  |  |  |  | ch33 |
|  |  | ch19 |  |  |  |  |
|  | ch40 |  |  |  |  | ch34 |
|  |  | ch20 |  |  |  |  |
|  |  | ch21 |  |  |  |  | ch35 |
|  |  |  |  |  |  |  |
|  |  | ch22 |  |  |  |  ch36 |
|  |  |  |  |  |  | ch37 |
|  |  |  |  |  |  | ch38 |
|  |  |  |  |  |  | ch39 |
|  |  |  |  |  |  | ch40 |

FIG. 7

| MAIN SCAN n-1 | MAIN SCAN n | MAIN SCAN n+1 |
|---|---|---|
|  | ch16 |  |
| ch37 |  |  |
|  | ch17 |  |
| ch38 |  |  |
|  | ch18 |  |
| ch39 |  |  |
|  | ch19 |  |
| ch40 |  |  |
|  | ch20 |  |
|  | ch21 |  |
|  |  | ch1 |
|  | ch22 |  |
|  |  | ch2 |
|  | ch23 |  |
|  |  | ch3 |
|  | ch24 |  |
|  |  | ch4 |
|  | ch25 |  |
|  |  | ch5 |
|  | ch26 |  |
|  |  |  |
|  | ch27 |  |

7-1
7-2

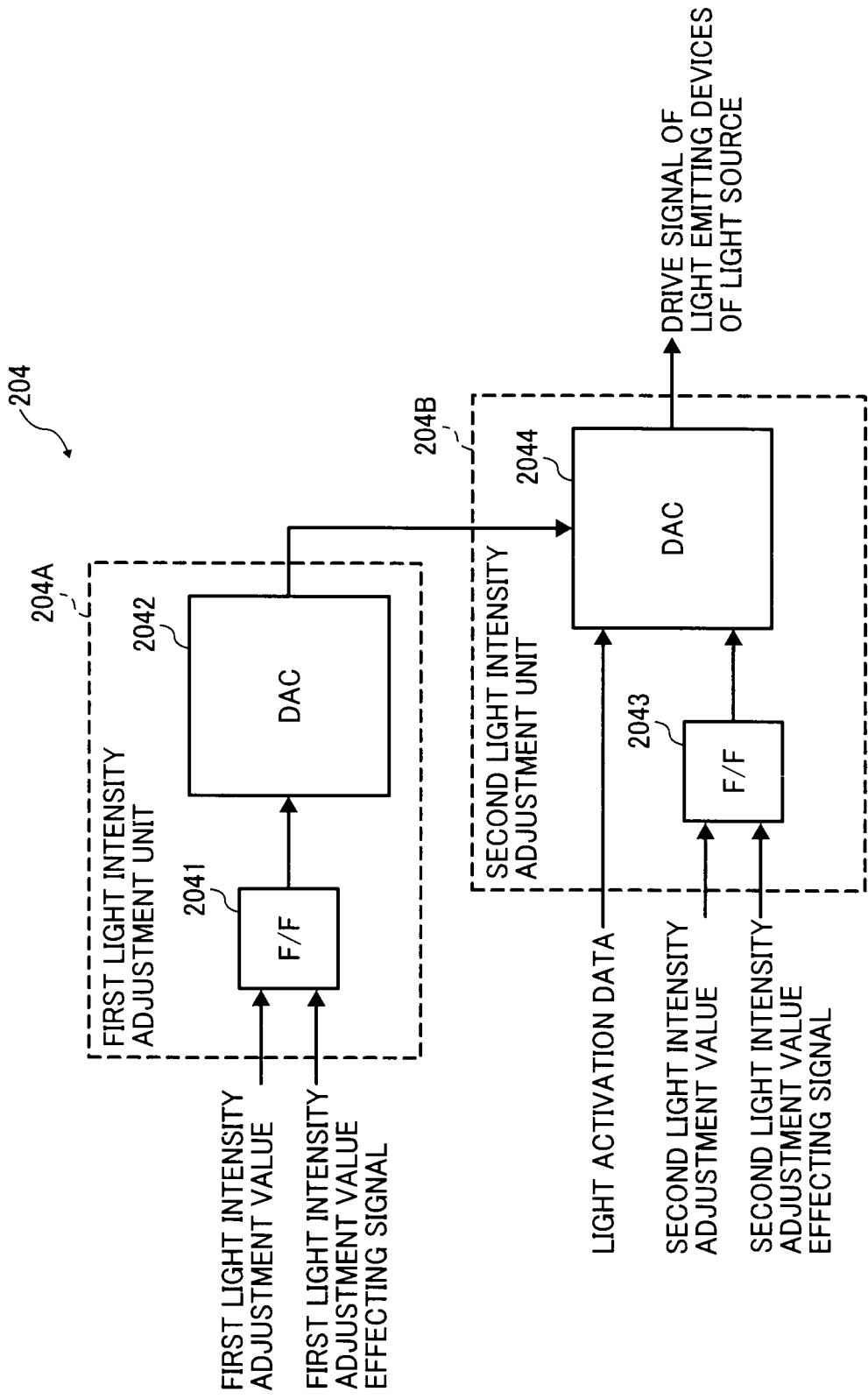

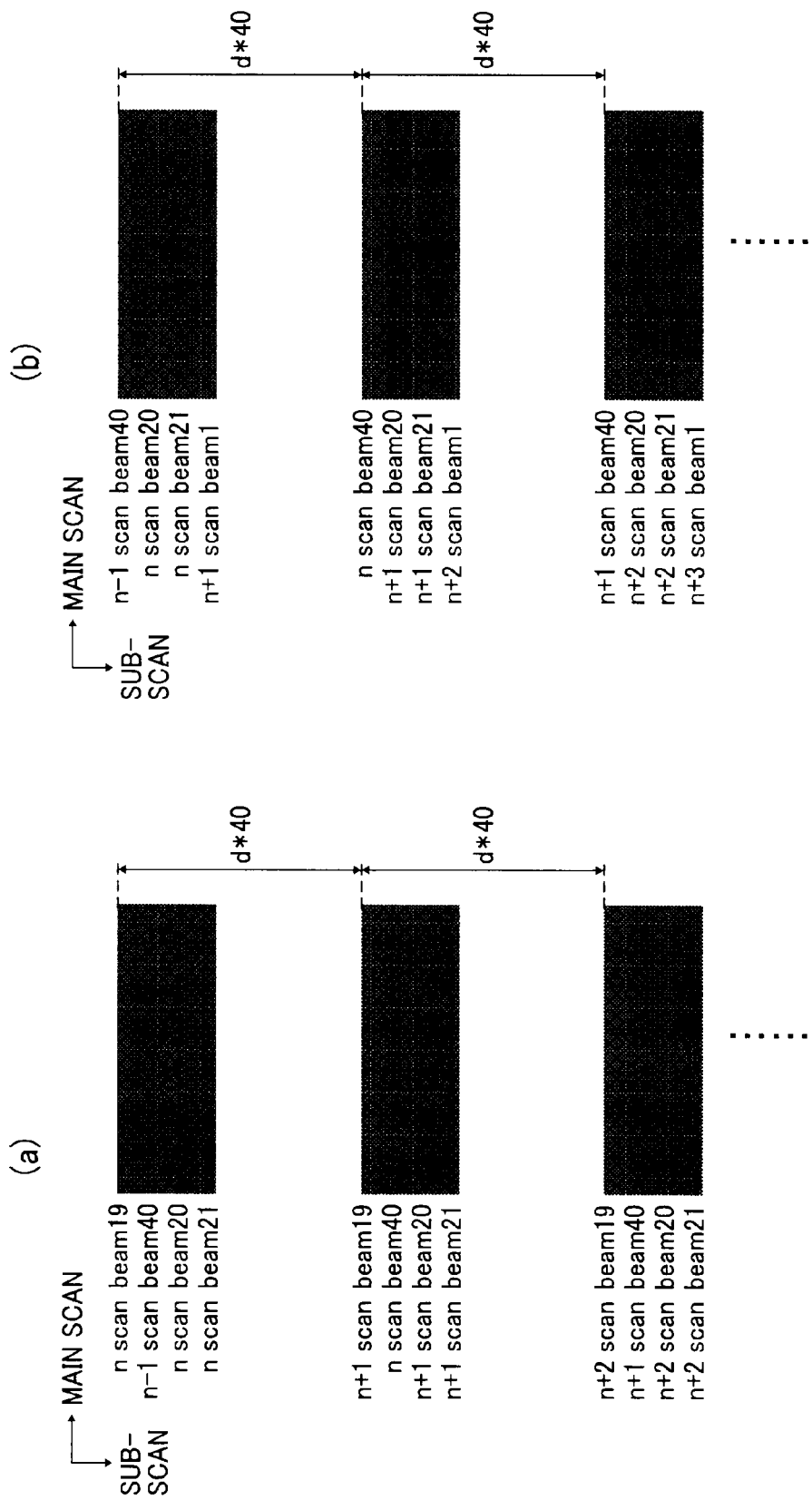

IMAGE FORMING APPARATUS

CROSS-REFERENCE TO RELATED APPLICATIONS

This application claims priority to Japanese Patent Application No. 2010-129476, filed on Jun. 4, 2010 in the Japan Patent Office, which is incorporated by reference herein in its entirety.

BACKGROUND OF THE INVENTION

1. Field of the Invention

The present invention relates to image forming apparatuses using electrophotography, such as copiers, printers, facsimile machines, and digital multi-functional machines employing multi-beam writing.

2. Description of the Background Art

Some electro-photographic image forming apparatuses use a multi-beam writing system to form images. In such image forming apparatuses, banding may appear in the formed images due to reciprocity law failure, a phenomenon in which the law of reciprocity ("exposure amount=light intensity×time") is not established, resulting in image quality deterioration. Banding occurring as a stripe pattern may cause uneven image density. A similar problem may also occur in image forming apparatuses using a vertical cavity surface emitting laser (VCSEL), which have been recently developed and are now commercially available.

Conventionally, the effect of reciprocity law failure may be reduced by adjusting the light intensity of light emitting elements disposed at the edge portion of the laser generator. For example, JP-2003-182139-A discloses a multi-beam writing system, in which uneven image density may occur at a sub-scanning direction boundary area between adjacent main scanning lines. To set the image density at the sub-scanning direction boundary area to the same image density as that of the image formed in the same scan, the light intensity of light emitting elements at the edge portion in the sub-scanning is set smaller than the light intensity of light emitting elements at the center portion in the sub-scanning direction.

Further, JP-2004-106365-A also discloses a multi-beam writing system, in which uneven image density may occur at a sub-scanning direction boundary area between the adjacent main scanning lines formed on a given image bearing face. To set the image density at the sub-scanning direction boundary area to the same image density of one main scanning line when a simultaneous scanning of multi-beam scan is conducted on a given image bearing face, the overlapped or superimposed length of adjacently formed scan lines in the sub-scanning direction is set shorter than a minimum pixel.

JP-2009-040031-A describes an image forming apparatus using a vertical cavity surface emitting laser array, in which a plurality of light emitting elements are arrayed two-dimensionally. The interval or pitch of light emitting elements arranged at the center portion in the sub-scanning direction is set narrower than the interval between light emitting elements arranged at other portions in the sub-scanning direction.

However, when the light intensity adjustment of light source is conducted at the edge portion in the sub-scanning in such conventional multi-beam system, in a case in which the intervals between light emitting elements arranged at the center portion in the sub-scanning direction is set narrower than the intervals between light emitting elements arranged at other portions in the sub-scanning direction in the light source and interlace scanning conducted for writing images, the light intensity adjustment is not be conducted evenly throughout the image, and therefore banding cannot be eliminated from the image.

When a light source having a plurality of light emitting elements is used for foaming an image using an interlace scanning process with higher density writing, although an image having a desired resolution level may be formed using a plurality of light emitting elements the image may be formed with uneven image density due to the effect of reciprocity law failure.

Light intensity can be adjusted to minimize or eliminate such uneven image density. However, adjustment of the light intensity of the light emitting elements at the edge portion in the sub-scanning direction of the light source alone may not be effective to suppress fluctuation of light intensity, by which uneven image density cannot be reduced or eliminated from the image.

SUMMARY

In one aspect of the present invention, an image forming apparatus includes a photoconductor, a charger to charge a surface of the photoconductor, a multi-beam scanning unit, a development unit, and a transfer unit. The multi-beam scanning unit includes a vertical cavity surface emitting laser as a light source having a plurality of light emitting elements two-dimensionally arrayed in a main scanning direction and a sub-scanning direction perpendicular to the main scanning direction and arranged so that an interval between light emitting elements adjacently disposed at a center portion of the scanning unit in the sub-scanning direction is set narrower than an interval between other light emitting elements adjacently disposed at other portions of the scanning unit in the sub-scanning direction, a deflecting element to deflect a plurality of light beams emitted from each of the plurality of light emitting elements to scan and expose the charged surface of photoconductor to write a two-dimensional electrostatic latent image on the photoconductor by conducting an interlace scan on the photoconductor in the main scanning direction and the sub-scanning direction perpendicular to the main scanning direction while the surface of photoconductor is moving in the sub-scanning direction, and a light intensity adjustment unit to adjust a light intensity of at least one of the light emitting elements adjacently disposed at the center portion in the sub-scanning direction relative to a light intensity of other light emitting elements adjacently disposed at other portions in the sub-scanning direction. The development unit develops the electrostatic latent image, using a development agent, formed on the surface of photoconductor. The transfer unit transfers the image developed on the surface of photoconductor by the development unit to a transfer medium. The light beams are emitted from a given number of the light emitting elements of the light source to write an image of one pixel while setting a writing resolution level is higher than a raster resolution level.

In another aspect of the present invention, an image forming apparatus includes a photoconductor, a charger to charge a surface of the photoconductor, means for multi-beam scanning including a light source having a plurality of light emitting elements and a deflecting element to deflect a plurality of light beams emitted from each of the plurality of light emitting elements to scan and expose the charged surface of photoconductor to write a two-dimensional electrostatic latent image on the photoconductor by conducting an interlace scan on the photoconductor in the main scanning direction and the sub-scanning direction while the surface of photoconductor moving in the sub-scanning direction perpendicular to the main scanning direction, means for adjusting light intensity of at least one of the light emitting elements adjacently disposed at the center portion of the light source in the sub-scanning direction relative to a light intensity of other light emitting elements adjacently disposed at other portions in the sub-scanning direction, a development unit to develop the electrostatic latent image, using a development agent, formed on the surface of photoconductor, and a transfer unit to transfer the image developed on the surface of photoconductor by the development unit to a transfer medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B show an example pattern of interlace scanning process for image forming apparatus according to an example embodiment;

FIG. 5 shows an example potential profile of electrostatic latent image formed on a photoconductor using simultaneous scanning process and sequential scanning process, in which FIG. 5(a) shows an example potential profile of electrostatic latent image using the simultaneous scanning, and FIG. 5(b) shows an example potential profile of electrostatic latent image using the sequential scanning process;

FIG. 7 shows another example image forming by using light emitting elements at the center portion in the sub-scanning direction;

FIG. 9 shows an example block diagram of light intensity adjustment unit disposed in the driver circuit of FIG. 8 for light emitting elements at the center portion in the sub-scanning direction;

Figure 1:
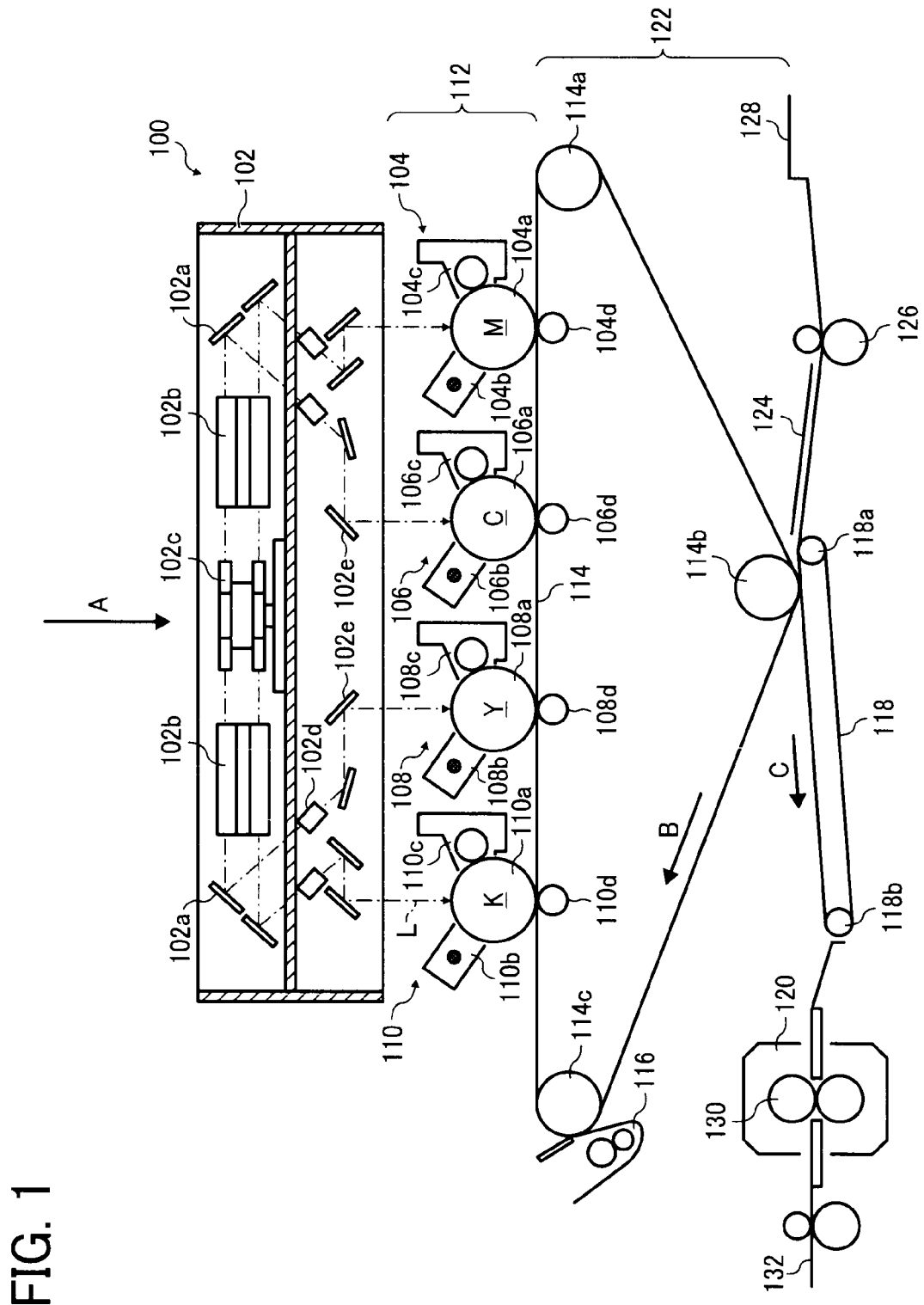
FIG. 1 shows a schematic configuration of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, an image forming apparatus according to example embodiment is described hereinafter.

FIG. 1 shows a schematic configuration of an image forming apparatus 100 according to an example embodiment. The image forming apparatus 100 includes, for example, an optical writing unit 102, an image forming section 112, and a transfer section 122. The image forming apparatus 100 may be a tandem type color image forming apparatus, but not limited thereto. The optical writing unit 102 may include optical elements such as a semiconductor laser and a polygon mirror. The image forming section 112 may include image forming process units 104, 106, 108, and 110 for each of colors such as magenta (M), cyan (C), yellow (Y), and black (K). The transfer section 122 may include an intermediate transfer belt 114.

In the image forming section 112, each of the image forming process units 104, 106, 108, and 110 respectively includes photoconductor drums 104a, 106a, 108a, 110a as a photoconductor, chargers 104b, 106b, 108b, 110b as a charging unit, development units 104c, 106c, 108c, 110c as a development device, and primary transfer rollers 104d, 106d, 108d, 110d. Such units are disposed around the photoconductor drums.

The optical writing unit 102 may be a multi-beam scanning unit, in which one or more light emitting elements such as semiconductor lasers emit laser beams, and a deflecting element such as a polygon mirror 102c deflects and guides the laser beam to a f-theta lens 102b. The laser beam is generated for the number of colors such as M, C, Y, K colors, and each of laser beams passes the f-theta lens 102b, and then is reflected by a reflection mirror 102a.

Then, each of the laser beams passes a lens 102d such as a WTL lens to adjust the shape of laser beam, and then the laser beams are reflected or deflected by a plurality of reflection mirrors 102e, and used as a laser beam L to expose the surface of photoconductor drums 104a, 106a, 108a, 110a of each of the image forming process units 104, 106, 108, and 110.

Because a plurality of optical elements are used to irradiate the laser beam L to the photoconductor drums 104a, 106a, 108a, 110a, timing synchronization may be conducted for the main scanning direction and the sub-scanning direction. The main scanning direction is defined as the scanning direction of the laser beam L, and the sub-scanning direction is defined as a direction perpendicular to the main scanning direction. In the image forming apparatus 100, the sub-scanning direction is a rotating direction of the photoconductor drums 104a, 106a, 108a, 110a, or a surface moving direction of photoconductor rotatable in one direction.

Each of the photoconductor drums 104a, 106a, 108a, 110a may be a photoconductive drum, which may be an aluminum drum coated with a photoconductive layer having at least a charge generation layer and a charge transport layer. The photo-conductive layer is charged by the chargers 104b, 106b, 108b, 110b such as a corotron, a scorotron, or a charge roller to apply a surface potential on the photo-conductive layer of each of the photoconductor drums 104a, 106a, 108a, 110a. The charged photoconductive layer of each of the photoconductor drums 104a, 106a, 108a, 110a is then exposed by the laser beam L coming from the optical writing unit 102 to form a two-dimensional electrostatic latent image on each of the photoconductor drums 104a, 106a, 108a, 110a.

The electrostatic latent images formed on photoconductor drums 104a, 106a, 108a, 110a can be developed by the development units 104c, 106c, 108c, 110c as toner images of M, C, Y, K colors. Each of development units 160 may include a development sleeve, a development agent supply roller, a doctor blade, and one toner such as one of development agent of M, C, Y, K. Each of the toner images is transferred from the photoconductor drums 104a, 106a, 108a, 110a to the intermediate transfer belt 114 at the primary transfer section set between the photoconductor drums 104a, 106a, 108a, 110a and the intermediate transfer belt 114. Specifically, primary transfer rollers 104d, 106d, 108d, 110d facing the photoconductor drums 104a, 106a, 108a, 110a via the intermediate transfer belt 114 are used as a transfer unit, in which a transfer bias voltage is applied to the transfer unit, and then the toner images of K, Y, C, M are sequentially and superimposingly transferred to the intermediate transfer belt 114 (transfer medium) moving in a direction shown by an arrow B at the primary transfer section.

The intermediate transfer belt 114 is extended by transport rollers 114a, 114b, and 114c, in which the transport roller 114a or 114c is used as a drive roller to rotate the intermediate transfer belt 114 in a direction shown by an arrow B and transported to the secondary transfer section while bearing a full color toner image, which is a superimposed and transferred toner images of K, Y, C, M. The secondary transfer section may include a secondary transfer belt 118, which can be rotated in a direction shown by an arrow C by transport rollers 111a and 118b. The transport roller 114b for the intermediate transfer belt 114 may function as a counter roller for secondary transfer.

A recording medium 124 such as sheet (e.g., high quality paper, plastic sheet) may be supplied to the secondary transfer section from a sheet feed cassette such as a recording medium container 128 using a transport roller 126. Then, the secondary transfer bias is applied to the transport roller 114b, used also as the counter roller for secondary transfer process, to transfer a full color toner image carried on the intermediate transfer belt 114 onto the recording medium 124, which is adsorbed on the secondary transfer belt 118.

The recording medium 124 having transferred with the full color toner image is transported to a fusing unit 120 with a movement of the secondary transfer belt 118 in a direction shown by an arrow C. The fusing unit 120 may include a fusing member 130 such as a fusing roller made of silicone rubber, fluoro rubber, or the like. The fusing unit 120 applies heat and pressure to the toner images and the recording medium 124 to fuse the toner image on the recording medium 124, and then is ejected outside of the image forming apparatus 100 as a print product 132. Further, after the toner image are transferred, a cleaning unit 16 including a cleaning blade may remove toner remaining on the intermediate transfer belt 114 to prepare for the next image forming process.

Figure 2:
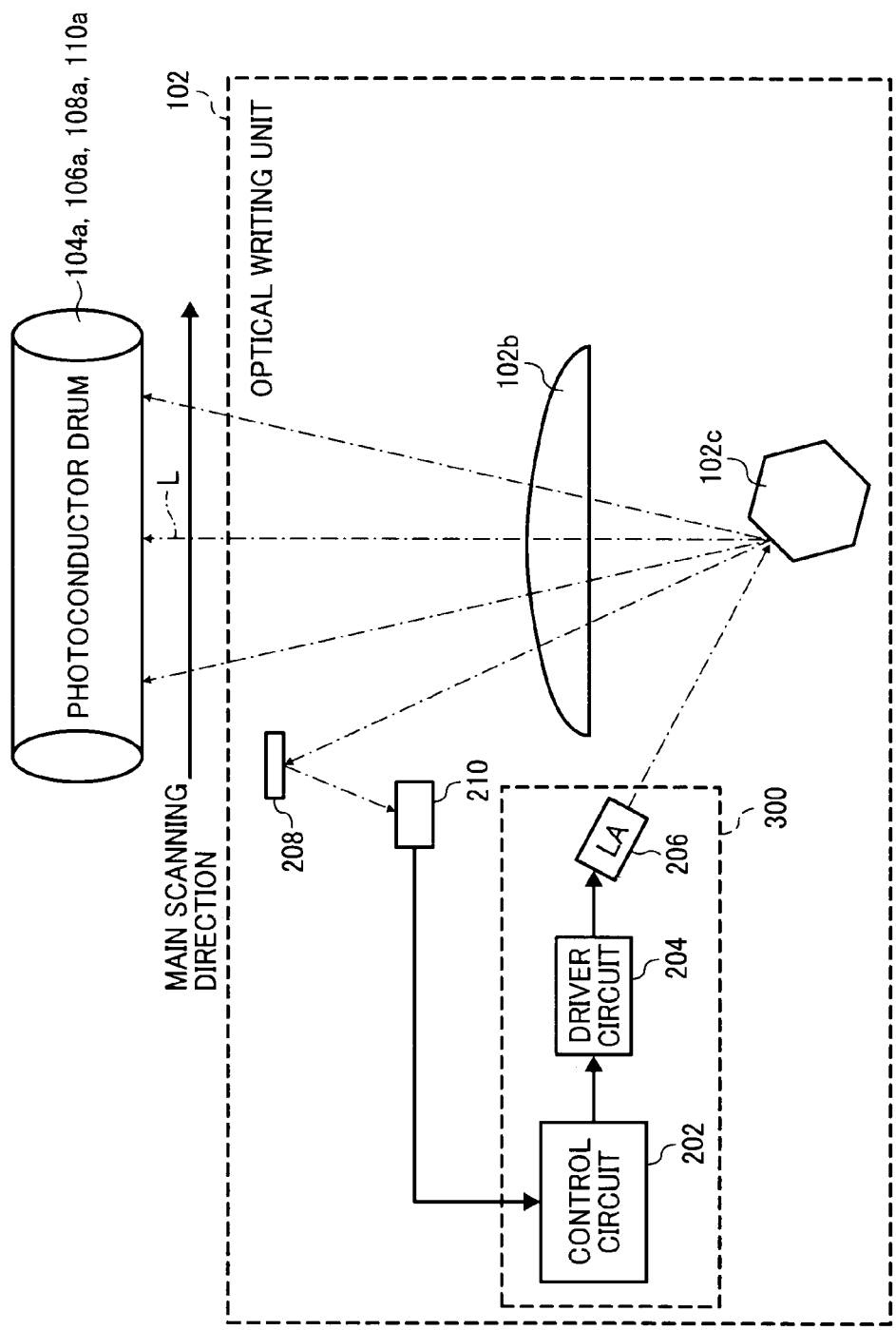
FIG. 2 shows an optical writing unit and an exposing control unit and a photoconductor drum viewed from a direction shown by an arrow in FIG. 1.

FIG. 2 shows the optical writing unit 102 viewed from a direction shown by an arrow A in FIG. 1 with an exposing control unit and a photoconductor drum. The optical writing unit 102 may include the polygon mirror 102c, the f-theta lens 102b, a reflection mirror 208, and a synchronization detector 210. The reflection mirror 208 is used to reflect the laser beam L, deflected by the polygon mirror 102c, to the synchronization detector 210, which may be an optical sensor such as photodiode, to detect the laser beam L. The laser beam used for such synchronization detection enters the reflection mirror 208 before the laser beam L starts to write image on the photoconductor drum along the main scanning direction.

The optical writing unit 102 may further include a control circuit 202, a driver circuit 204, and an exposing control unit 300, for example. The control circuit 202 includes a central processing unit (CPU). The driver circuit 204 is used to activate a light emission of semiconductor laser, and the exposing control unit 300 may include a vertical cavity surface emitting laser (VCSEL) 206 used as a light source.

The polygon mirror 102c, driven by a polygon motor at a rotation speed of several thousands to several tens of thousands revolution per minute (rpm), deflects the laser beam coming from the VCSEL 206 as the laser beam L with a given angle range, and then the laser beam L passing the f-theta lens 102b irradiates the photoconductor drums 104a, 106a, 108a, 110a.

The control circuit 202 prepares a dot image using image data scanned by an image scanning unit or stored in an image memory. For example, the control circuit 202 prepares a dot image of 4800 dpi (dot per inch) as high resolution level from image data having a resolution level of 600 dpi or 1200 dpi.

Further, the control circuit 202 conducts a laser output control to emit a laser beam from the VCSEL 206 with a given laser output power, and outputs a pulse width modulation (PWM) signal or power modulation (PM) signal to the driver circuit 204.

Upon receiving such signal, the driver circuit 204 supplies power to the VCSEL 206 as a light-emission activation current to operate the VCSEL 206 at a given output power. Then, the VCSEL 206 emits a laser beam or light flux in response to the signal received from the control circuit 202. The laser beam or light flux is used to form an electrostatic latent image on the photoconductor drums 104a to 110a with a given resolution level. A laser beam detection signal output from the synchronization detector 210 is input to the control circuit 202, and used to determine a write-start timing in the main scanning direction.

Figure 3:
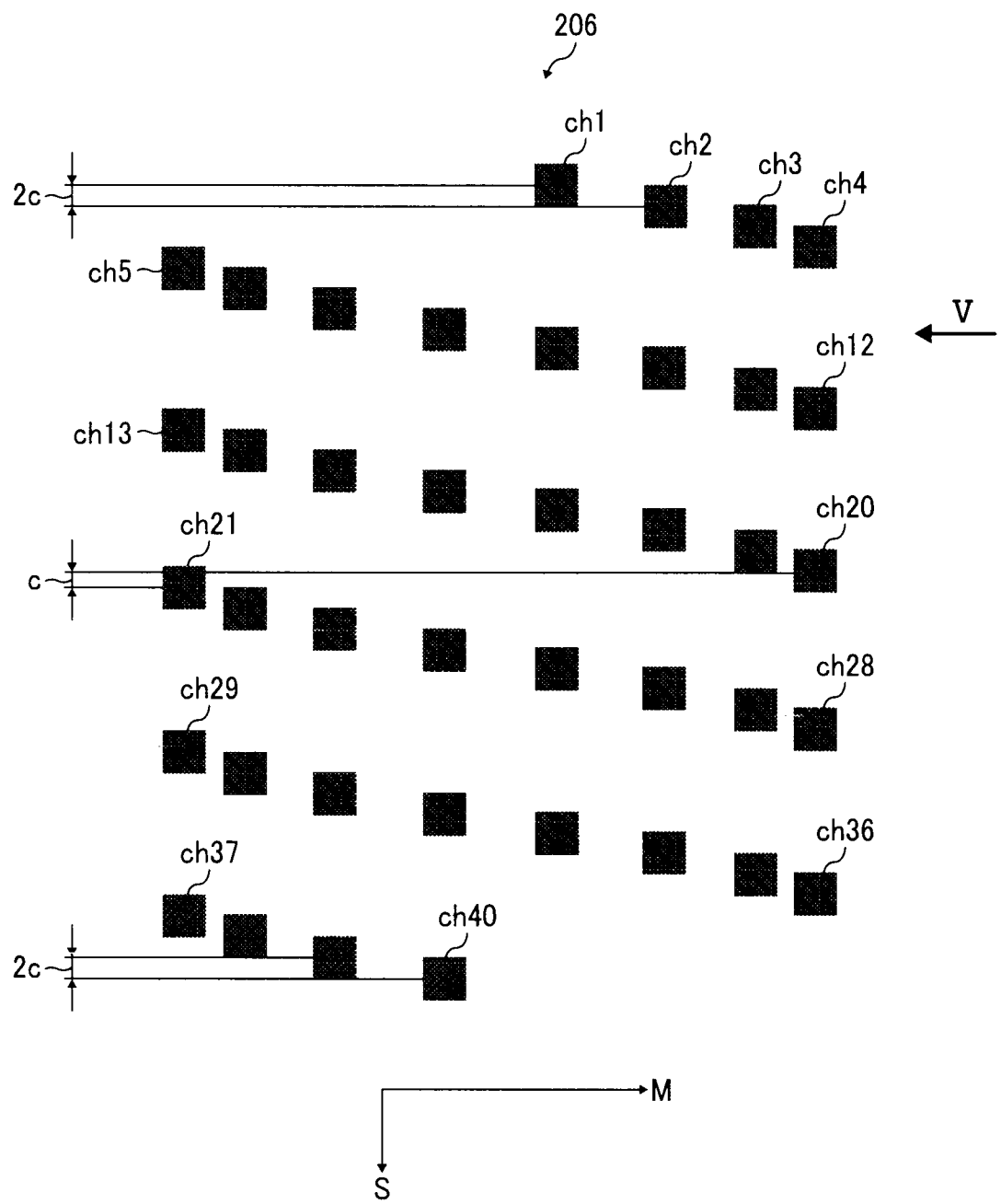
FIG. 3 shows an example arrangement pattern of light emitting elements in a vertical cavity surface emitting laser (VCSEL)

FIG. 3 shows an example arrangement pattern of light emitting elements disposed for the vertical cavity surface emitting laser (VCSEL) 206. The VCSEL 206, used as a light source, includes a plurality of light emitting elements arranged two-dimensionally in the main scanning direction (M direction) and the sub-scanning direction (S direction) while the positions of each of the light emitting elements being shifted with a given interval as shown in FIG. 3. For example, forty light emitting elements may be arranged two-dimensionally in the main scanning direction and the sub-scanning direction while the positions of each of the light emitting elements are being shifted a given interval as shown in FIG. 3.

For example, the forty light emitting elements may be arranged with the following arrangement order. When each of the light emitting elements is projected on one virtual line extending in the sub-scanning direction, and then each of the light emitting elements are viewed from a direction shown by an arrow V in FIG. 3, the first light emitting element, disposed at the most minus side of S direction (−S) that is the most upper side in FIG. 3, can be referred to as "ch1." Then, the second light emitting element disposed next to the "ch1" and toward the plus side of S direction (+S) can be referred to as "ch2." Then, the third light emitting element disposed next to the "ch2" and toward the plus side of S direction (+S) can be referred to as "ch3." Then, the fourth light emitting element disposed next to the "ch3" and toward the plus side of S direction (+S) can be referred to as "ch4." Such arrangement order further continues, and the fortieth light emitting element can be referred to as "ch40." As such, the arrangement order of light emitting elements may be expressed by the number order of "ch" number (No.), wherein "ch" may mean be a channel.

The interval or pitch of the light emitting elements in the S direction may be set as follows. When a given value of "c" is set, the interval between the adjacent light emitting elements from the light emitting element ch1 to the light emitting element ch20 is the set with an interval of "2c," the interval between the light emitting element ch20 and light emitting element ch21 is set with an interval of "c," and the interval between the adjacent light emitting elements from the light emitting element ch21 to the light emitting element ch40 is set with the interval of "2c." As such, the interval or pitch of light emitting elements disposed at the center portion in the sub-scanning direction is set smaller or narrower than the interval or pitch of light emitting elements disposed at other portions in the sub-scanning direction.

Specifically, in an example embodiment, the optical writing unit 102 used as the multi-beam scanning unit may include a light source such as a vertical cavity surface emitting laser (VCSEL) that arrays a plurality of light emitting elements two-dimensionally in the main scanning direction (M direction) and the sub-scanning direction (S direction) with a given interval. The interval between the light emitting elements ch20 and ch21, which are adjacent light emitting elements at the center portion in the sub-scanning direction is set narrower than the interval between adjacent light emitting elements of other portions in the sub-scanning direction, wherein the adjacent light emitting elements of other portions in the sub-scanning direction means light emitting elements ch1 to ch20, and ch21 to ch40 in an example case shown in FIG. 3. The interval between adjacent light emitting elements is an interval between adjacent light emitting elements when each of the light emitting elements are projected on one virtual line extending in the sub-scanning direction and when each of the light emitting elements are viewed from a direction shown by an arrow V in FIG. 3.

FIGS. 4A and 4B show an example process of interlace scanning for the image forming apparatus according to an example embodiment. In the interlace scanning process shown in FIGS. 4A and 4B, when the scanning for the (n−1)-th main scan line is completed, the photoconductor drum is rotated in the sub-scanning direction to shift the light irradiation position on the surface of photoconductor drum so that the light emitting element ch1 can irradiate a light onto a position on the photoconductor drum, which is shifted for the value of "−c" from the position on the photoconductor drum irradiated by the light emitting element ch21. Then, the scanning for the (n)-th main scan line is conducted.

When the scanning for the (n)-th main scan line is completed, the photoconductor drum is rotated in the sub-scanning direction to shift the light irradiation position on the surface of photoconductor drum so that the light emitting element ch1 can irradiate a light onto a position on the photoconductor drum, which is shifted for the value of "−c" from the position on the photoconductor drum irradiated by the light emitting element ch21. Then, the scanning for the (n+1)-th main scan line is conducted. As for the interlace scanning process conducted with such a configuration, the surface of photoconductor drum may be scanned in the sub-scanning direction with a given interval corresponding to the given value of "c."

Figure 5:
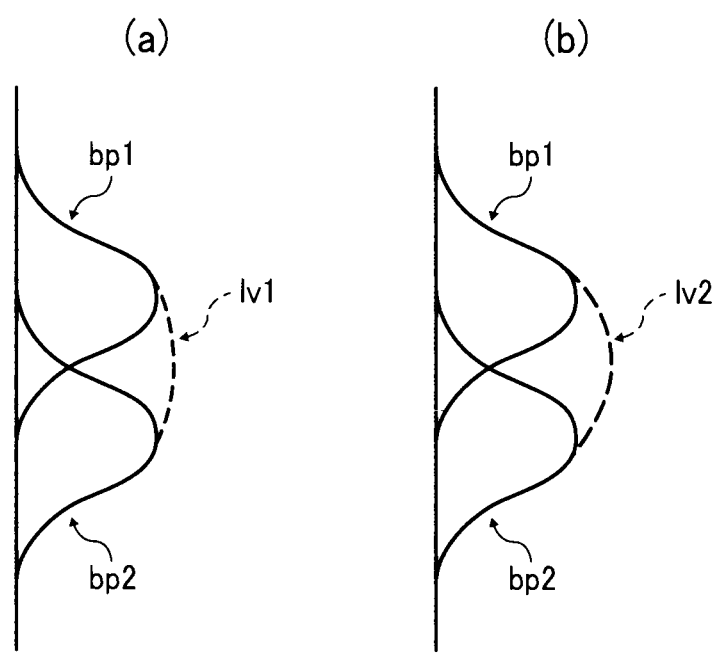

FIG. 5 shows an example potential profile of electrostatic latent image formed on a photoconductor using simultaneous scanning process and sequential scanning process. As discussed in the background, problems such as uneven image density may occur due to the reciprocity law failure which may occur in an image forming process using electrophotography and multi-beam system. For example, as shown in FIG. 5(*a*), when two laser beams adjacent each other in the sub-scanning direction and having exposing light powers bp 1 and bp 2 expose the photoconductor simultaneously, an electrostatic latent image may be formed on the photoconductor as a profile lv1 with a given potential (simultaneous scanning and exposing process).

In contrary, as shown in FIG. 5(*b*), when the two laser beams adjacent each other in the sub-scanning direction and having exposing light powers bp 1 and bp 2 expose the photoconductor sequentially such as sequentially scanning the (n)-th main scan line and (n+1)-th main scan line next to the (n)-th main scan line, an electrostatic latent image may be formed on the photoconductor with as a profile lv2 having a given potential. (sequential scanning and exposing process). Although the exposing light power of two laser beams adjacent each other is set same in FIGS. 5(*a*) and 5(*b*), the potential of profile lv2 for the electrostatic latent image may become different from the potential of profile lv1. As such, if the adjacent laser beams are scanned with different timing, the electrostatic latent image may be formed with different forming conditions, and resultantly, the image density unevenness such as banding may occur to the printed image.

Figure 6:
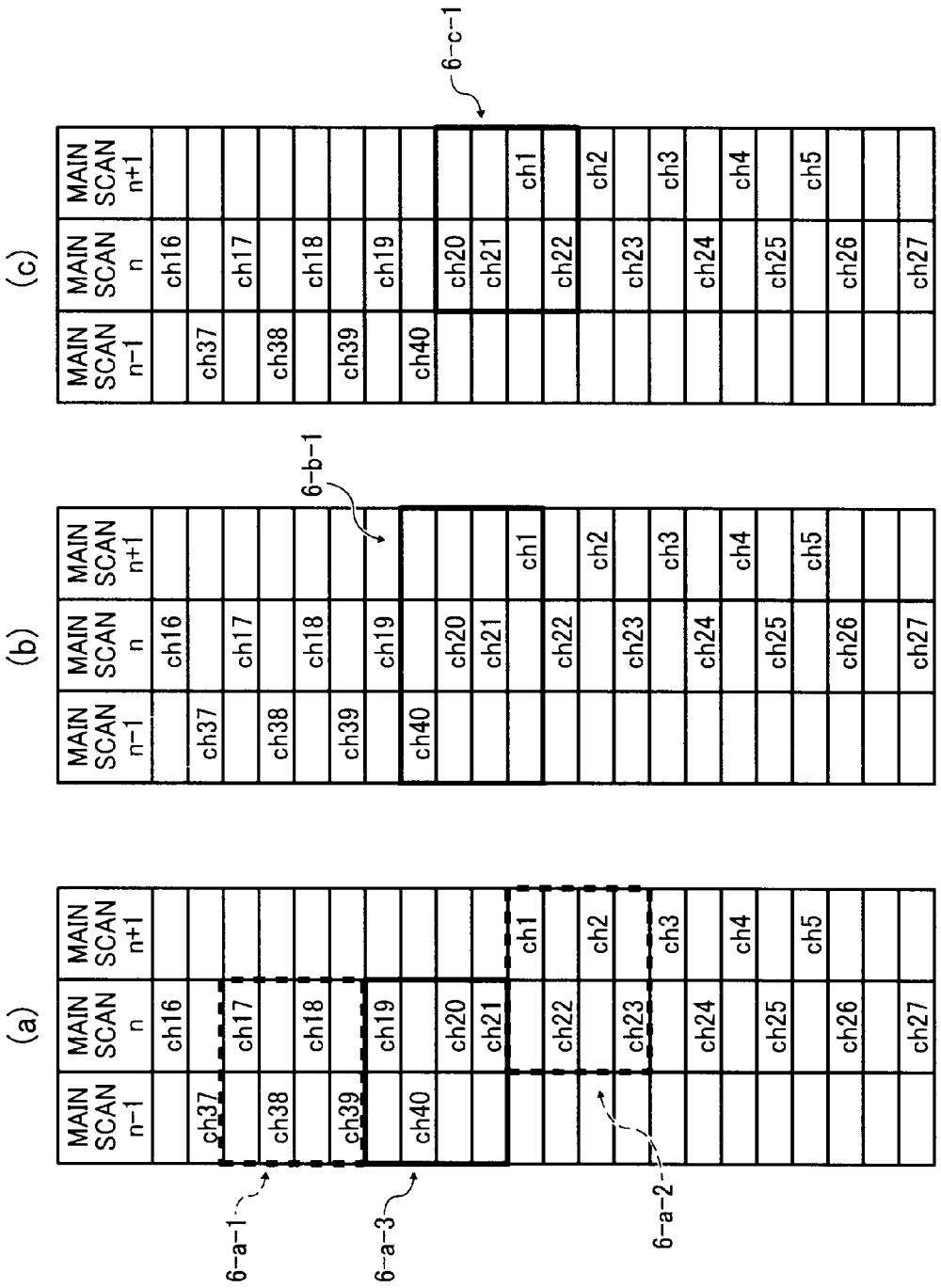
FIG. 6 shows example image forming by using light emitting elements at the center portion in the sub-scanning direction.

FIG. 6 shows examples of images formable using light emitting elements at the center portion in the sub-scanning direction. For example, a pixel data may be input to the exposing control unit 300 (FIG. 2) in the copiers or MFP, in which the pixel data may be generated by processing image data scanned by a scanner, or the pixel data may be generated by processing image data transmitted from a personal computer (PC) or the like. Recently, with the employment of a vertical cavity surface emitting laser (VCSEL) having a smaller or narrower interval or pitch between adjacent light emitting elements, an image having a resolution level higher than the resolution level of pixel data, input to the exposing control unit 300, can be written, in which the following relationship can be set.

writing resolution level>raster data resolution level

In an example embodiment, the writing resolution level may be set to, for example, 4800 dpi, and the raster data resolution level may be set to 1200 dpi or 600 dpi, but the settings may not be limited thereto. FIG. 6 shows an example case when one pixel of 1200 dpi (shown by a frame of bold solid line or dotted line), prepared as raster data, is written on a photoconductor using four light emitting elements emitting four light beams. Specifically, such one pixel is written by activating the light emitting elements having the specific numbers (i.e., ch numbers) when the specific number of scan line (such as main scan lines: n−1, n, n+1) is scanned. Especially, one pixel to be written using the light emitting elements including the light emitting elements ch20 and ch21 (i.e., light emitting elements at or near the center portion in the sub-scanning direction) is shown in FIG. 6.

Because the writing resolution level is set to 4800 dpi to form one pixel of 1200 dpi in this example case, four light emitting elements adjacent in the sub-scanning direction may need to be activated to emit light beams onto the photoconductor. Because the writing resolution level is set higher than the raster resolution level, one pixel is written with a plurality of light beams emitted from a selected plurality of light emitting elements disposed in the light source. Although the writing resolution level is set to 4800 dpi and the raster resolution level is set to 1200 dpi in this example and four light emitting elements is used for writing an image of one pixel, such resolution level can be set to other values, and the number of light emitting elements for a writing an image of one pixel under one resolution level can be set to other values.

In the example shown in FIG. 6, if the light emitting elements ch20 and ch21 are activated under the simultaneous scanning and exposing process, and the light emitting elements other than the light emitting elements ch20 and ch21 are activated under the sequential scanning and exposing process, in which the reciprocity law failure may occur, by which the uneven image density may occur.

In a conventional image forming process disclosed in JP-2009-040031-A, the uneven image density may not be eliminated, and problems may occur on image quality. Further, in a conventional image forming process disclosed in JP-2003-182139-A, the light intensity of light emitting elements at the edge portion of the sub-scanning direction is set smaller than the light intensity of light emitting elements at the center portion of the sub-scanning direction, by which the fluctuation may occur to light intensity adjustment and thereby uneven image density may not be eliminated, and a complex process may be required for the conventional arts to cope with a situation shown in FIG. 6.

As for the image forming process of one pixel shown in FIG. 6, the laser beam power of light emitting elements may be set as follows in the conventional arts. For example, the laser beam power of light emitting elements ch2 to ch39, which are light emitting elements other than the light emitting elements ch1 and ch40 disposed at the edge portion of the sub-scanning direction, is set to 100, and the laser beam power of light emitting elements ch1 and ch40 is set to 80, which is lower than that of light emitting elements ch2 to ch39. When the simultaneous scanning process is conducted for forming one pixel of 1200 dpi with such laser beam power settings, the laser beam power in the sub-scanning direction may be set as follows when images are formed as image forming 6-*a*-3, image forming 6-*b*-1, and image forming 6-*c*-1.

image forming 6-*a*-3: [100, 80, 100, 100]
image forming 6-*b*-1: [80, 100, 100, 80]
image forming 6-*c*-1: [100, 100, 80, 100]

In this case, the total sum of laser beam power of one pixel becomes as follows. The total sum of laser beam power of one pixel for the image forming 6-*a*-3 and 6-*c*-1 are both 380, and the total sum of laser beam power of one pixel for the image forming 6-*b*-1 is 360. As such, one pixel image of 1200 dpi is formed with different levels of laser beam power, by which fluctuation may occur to the amount of light intensity adjustment, and thereby an image having even image density may not be formed.

In view of such situation, in an example embodiment, the light intensity adjustment may be conducted by setting the laser beam power of the light emitting elements ch20 and ch21, disposed at the center portion in the sub-scanning direction, to 80, which is smaller than the laser beam power of 100 set for other light emitting elements such as ch1 to ch19 and ch22 to ch40, disposed at other portions in the sub-scanning direction. With such settings, the laser beam power for the image forming can be set as follows for the image forming 6-*a*-3, image forming 6-*b*-1, and image forming 6-*c*-1 in an example embodiment.

image forming 6-*a*-3: [100, 100, 80, 80]
image forming 6-*b*-1: [100, 80, 80, 100]
image forming 6-*c*-1: [80, 80, 100, 100]

With such a configuration, the total sum of laser beam power of one pixel for any of the image forming 6-*a*-3, 6-*b*-1, and 6-*c*-1 is 360, and the fluctuation may not occur to the amount of light intensity adjustment, by which an image can be formed with uniform or even image density.

Further, at least one of the light emitting elements ch20 and ch21 disposed at the center portion in the sub-scanning direction may be set with the laser beam power of 80 to reduce the light intensity, which may mean one of the light emitting elements ch20 and ch21 is set with the laser beam power of 80, and the other one of the light emitting elements ch20 and ch21 may be set with the laser beam power of 100. In such a case, the total sum of the laser beam power for one pixel for any one of the above mentioned image forming 6-*a*-3, 6-*b*-1, and 6-*c*-1 is 380, and the fluctuation may not occur to the amount of light intensity adjustment, by which an image can be formed with uniform or even image density.

FIG. 7 shows an example pattern when two pixels are formed using the light emitting elements disposed at the center portion in the sub-scanning direction. The light emitting elements ch20 and ch21 shown in FIG. 7 may conduct a simultaneous scanning and exposing process when the light emitting elements ch20 and ch21 are used for forming different two pixels (e.g., 1200 dpi), in which the light intensity adjustment can be conducted as follows as similar to the above described example.

image forming 7-1: [100, 100, 100, 80]
image forming 7-2: [80, 100, 100, 100]

As shown in FIG. 5, the effect of reciprocity law failure may occur differently between the simultaneous scanning and exposing process and sequential scanning and exposing process. In FIG. 7, when the image forming 7-1 and image forming 7-2 are formed adjacently, the light emitting elements ch20 and ch21 conduct the simultaneous scanning and exposing. Further, when the image forming 7-1 and image forming 7-2 are not adjacently formed, the light emitting elements ch20 and ch21 conduct the sequential scanning and exposing process.

Accordingly, when the light emitting elements ch20 and ch21 conduct the simultaneous scanning and exposing process as similar to the above described image forming 6-a-3, 6-b-1, and 6-c-1, the uneven image density at the boundary area of the image forming 7-1 and image forming 7-2 can be reduced by adjusting the light intensity as above described for the image forming 6-a-3, 6-b-1, and 6-c-1.

However, if the light emitting elements ch20 and ch21 are used for the sequential scanning and exposing process while activating the light emitting elements ch20 and ch21 by reducing the light intensity both of the light emitting elements ch20 and ch21 as described above, the image density decrease in one pixel may occur and then the uneven image density may occur.

In view of such situation, the light emitting elements ch20 and ch21 may be activated as follows when to emit light beams. When both of the light emitting elements ch20 and ch21 are activated to emit light beams simultaneously, the light intensity of at least one of the light emitting elements ch20 and ch21 is set smaller than the light intensity of the light emitting elements disposed at portions other than the center portion in the sub-scanning direction.

Further, when only one of the light emitting elements ch20 and ch21 is activated to emit light beams, one of the light emitting elements ch20 and ch21 may be activated to emit a light beam with the light intensity same as the light intensity of other light emitting elements (i.e., not setting a smaller light intensity), by which the uneven image density can be reduced when the light emitting elements ch20 is used to form one pixel image and the light emitting elements ch21 is used to form another one pixel image, which may be adjacent to the one pixel image.

In the image forming operation using the interlace scanning process according to an example embodiment, the light activation condition of the light emitting elements ch20 and ch21 may be changed depending on how to form an image.

When the image forming such as image forming 6-b-1 shown in FIG. 6 is conducted for one pixel using both of the light emitting elements ch20 and ch21, the light intensity adjustment may be conducted by setting the light intensity of at least one of the light emitting elements ch20 and ch21 smaller than the light intensity of other light emitting elements, by which the effect of reciprocity law failure can be reduced or eliminated, and thereby the uneven image density phenomenon can be reduced or eliminated.

However, if the light intensity of the light emitting elements ch20 and/or ch21 is reduced without consideration how one pixel is formed, the uneven image density may occur. For example, if the image forming operation is conducted such as when one pixel is formed using one of the light emitting elements ch20 and ch21 and the light intensity of the light emitting elements ch20 and/or ch21 are reduced without consideration how one pixel is formed, the required level of image density may not be obtained, by which the uneven image density may occur. In such image forming condition using only one of the light emitting elements ch20 and ch21 (or when only one of the light emitting elements ch20 and ch21 is activated to emit a light beam), the light intensity of one of the light emitting elements ch20 and ch21 may not be reduced with respect to the light intensity of other light emitting elements such as ch1-19 and ch22-40, by which uneven image density can be reduced when adjacent two pixel are written using the light emitting elements ch20 and ch21 separately (i.e., one pixel uses ch20 and another pixel uses ch21).

Figure 8:
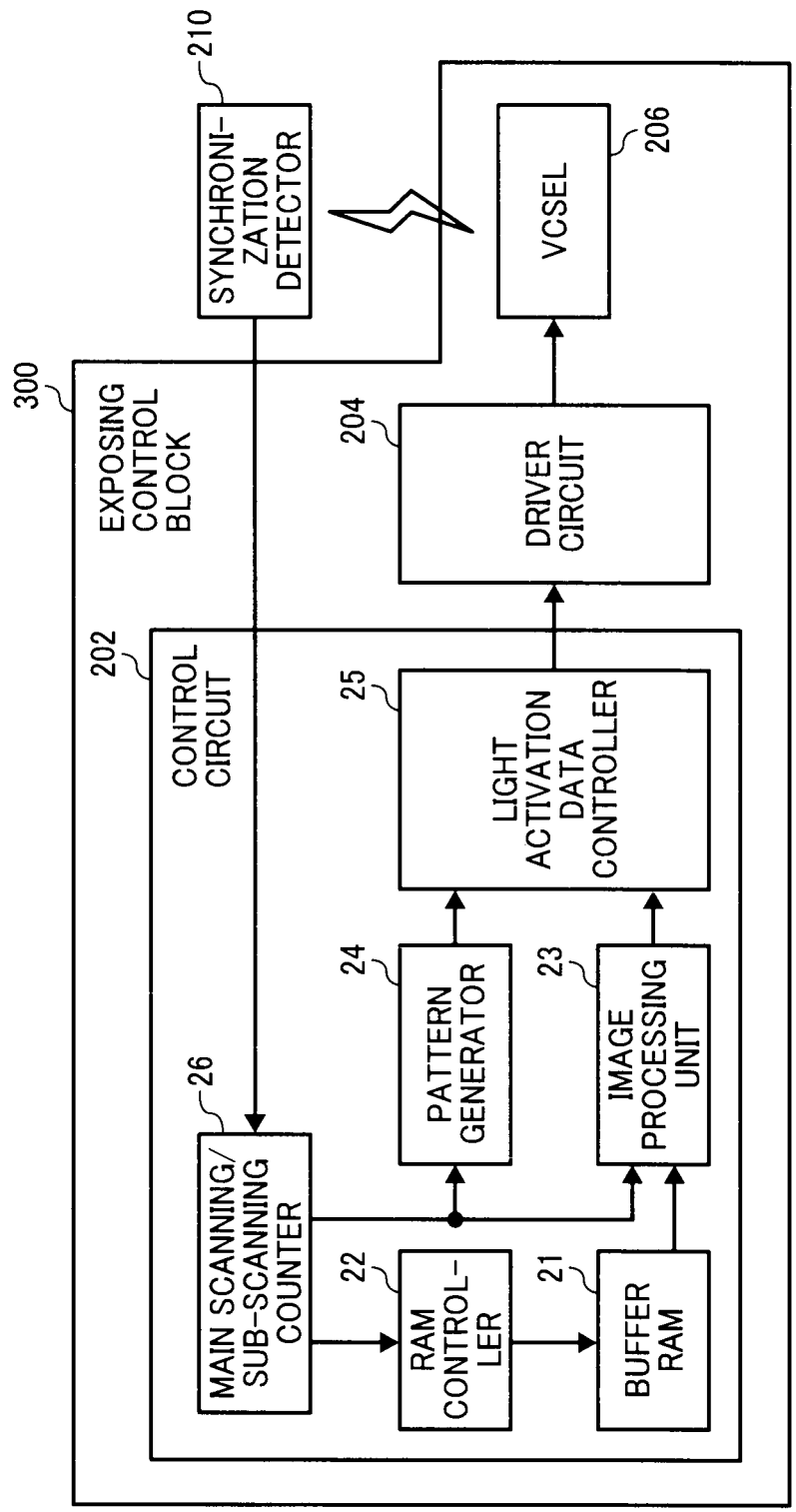
FIG. 8 shows an example block diagram of exposing control unit of FIG. 2.

FIG. 8 shows an example block diagram of the exposing control unit 300 shown in FIG. 2. The control circuit 202 of the exposing control unit 300 may include a buffer random access memory (RAM) 21, a RAM controller 22, an image processing unit 23, a pattern generator 24, a light activation data controller 25, and a main scanning/sub-scanning counter 26, and further include a resister controller, a shading correction unit, or the like.

The buffer RAM 21 stores raster data. The RAM controller 22 controls the buffer RAM 21. The image processing unit 23 reads out image data from the buffer RAM 21 and then conducts an image processing to the image data. The pattern generator 24 generates measurement patterns or the like. The light activation data controller 25 conducts a pulse width modulation (PWM) conversion to the image data, output from the image processing unit 23 and the pattern generator 24, to prepare the light activation data, and outputs the light activation data to the driver circuit 204. The main scanning/sub-scanning counter 26 is operated by using a synchronization detection signal detected by the synchronization detector 210 as a reference signal, in which the laser beam output from the VCSEL 206 can be detected by the synchronization detector 210.

FIG. 9 shows an example block diagram of light intensity adjustment unit disposed in the driver circuit 204 of FIG. 8. Such light intensity adjustment unit may be disposed for each of the light emitting elements adjacently disposed at the center portion in the sub-scanning direction such as for example light emitting elements ch20 and ch21. The driver circuit 204 may include a light intensity adjustment unit having a first light intensity adjustment unit 204A and a second light intensity adjustment unit 204B. Such light intensity adjustment unit is disposed for each of the light emitting elements ch20 and ch21.

The light activation data controller 25 (FIG. 8) inputs a first light intensity adjustment value and a first light intensity adjustment value effecting signal to the first light intensity adjustment unit 204A, and the light activation data controller 25 inputs a light activation data, a second light intensity adjustment value and a second light intensity adjustment effecting signal to the second light intensity adjustment unit 204B. The first light intensity adjustment value effecting signal and second light intensity adjustment effecting signal may be, for example, a clock signal, but not limited thereto.

The first light intensity adjustment unit 204A may include a flip flop circuit (F/F) 2041 and a digital/analog converter (DAC) 2042. As similar to other light emitting elements, the automatic power control (APC control) may be conducted for the light emitting elements ch20 and ch21 using the first light intensity adjustment value and the first light intensity adjustment effecting signal to set and latch a code setting value, used for adjusting the light intensity of each of the light emitting elements ch20 and ch21 at a suitable level, to the F/F 2041. The DAC 2042 converts such code setting value to an analog value, and then inputs the analog value to the DAC 2044 of the second light intensity adjustment unit 204B.

The second light intensity adjustment unit 204B may include a flip flop circuit (F/F) 2043 and a digital/analog converter (DAC) 2044. The F/F 2043 is used to latch a code setting value used for adjusting the light intensity of each of the light emitting elements ch20 and ch21, adjacently disposed at the center portion in the sub-scanning direction, based on the second light intensity adjustment value and the second light intensity adjustment effecting signal. The DAC 2044 converts such code setting value to an analog value. The light activation data of the light emitting elements ch20 and ch21, adjustable in view of the analog value converted by the DAC 2042, may be converted to an analog value in view of the code setting value converted at the DAC 2044. Then, a drive signal to drive the light emitting element of light source is output.

As such, in an example embodiment, the light intensity adjustment for light emitting elements ch20 and ch21 may be conducted by using the second light intensity adjustment unit 204B as the light intensity adjustment unit. Specifically, the light intensity of light emitting elements ch20 and ch21 can be adjusted to a suitable level by reducing the light intensity of light emitting elements ch20 and ch21 or not reducing the light intensity of light emitting elements ch20 and ch21.

As for the other light emitting elements (which are not the light emitting elements ch20 and ch21), only a light intensity adjustment unit corresponding to the first light intensity adjustment unit 204A may be disposed, in which the light activation data is input to the DAC 2042 in the first light intensity adjustment unit 204A, and then a code setting value for adjusting light intensity of each of channels at a suitable level is latched to the F/F 2041, then the DAC 2042 converts the code setting value to an analog value, and a drive signal to drive a light emitting element of light source is output.

As such, in an example embodiment, the second light intensity adjustment unit 204B may be used as the light intensity adjustment unit to set the light intensity of at least one of the adjacent light emitting elements ch20 and ch21, disposed at the center portion in the sub-scanning direction, smaller than the light intensity of other light emitting elements.

Figure 10B:
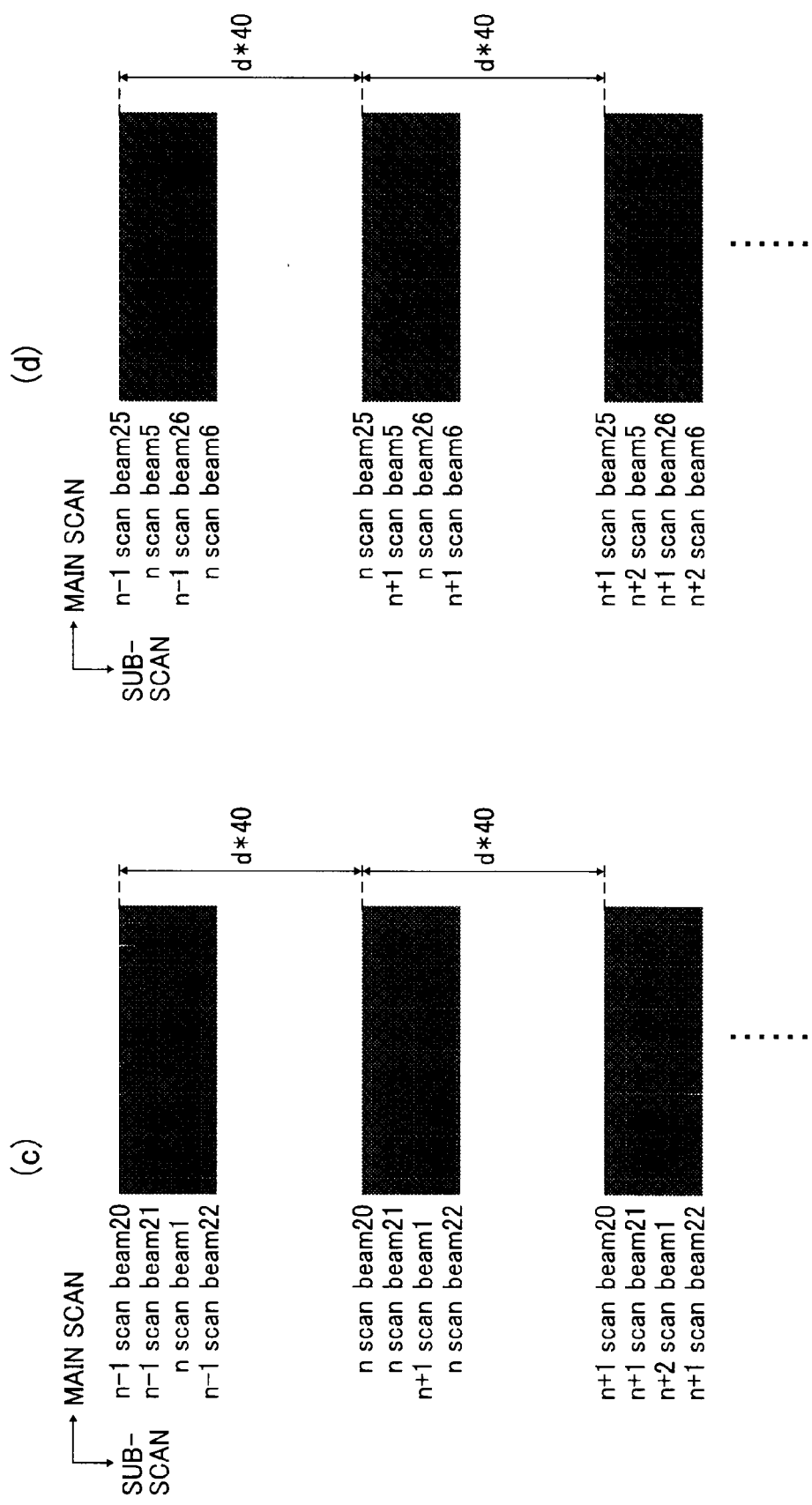
FIGS. 10A(a), 10A(b), 10B(c), and 10B(d) show example light activation patterns for measuring light intensity adjustment value.

FIG. 10 shows examples of light activation patterns used for measuring light intensity adjustment value. Hereinafter, the light activation patterns used for measuring light intensity adjustment value may be referred to the light activation pattern(s) for the simplicity of expression. FIGS. 10A(a), 10A(b), and 10B(c) show first light activation patterns formed by using four laser beams including the light emitting elements ch20 and ch21, and by the simultaneous scanning and exposing process for forming one pixel of 1200 dpi. FIG. 10B(d) shows a second light activation pattern formed by using four laser beams for forming one pixel of 1200 dpi, in which the light emitting elements ch20 and ch21 are not used, or laser beams of the light emitting elements ch20 and ch21 are not used for the simultaneous scanning and exposing process.

Further, FIG. 10B(d) shows an image pattern, which may correspond to the image forming 6-*a*-1 shown in FIG. 6 while using the light emitting elements differently compared to the light emitting elements shown in FIG. 6. FIG. 10A(a) shows an image pattern corresponding to the image forming 6-*a*-3, FIG. 10A(b) shows an image pattern corresponding to the image forming 6-*b*-1, and FIG. 10B(c) shows an image pattern corresponding to the image forming 6-*c*-1 shown in FIG. 6. If such image patterns are formed without conducting the light intensity adjustment, the fluctuation of image density may occur among the image patterns. Such fluctuation of image density may occur due to the difference of image forming conditions between the simultaneous scanning and exposing process and the sequential scanning and exposing process as above described. By conducting the light intensity adjustment, the fluctuation of image density can be reduced. For example, each of the image patterns may be detected by an optical detector to determine the fluctuation of image density, and based on the detection result, the light intensity of light emitting elements at the center portion in the sub-scanning direction may be adjusted.

Accordingly, as shown in FIG. 10, only a combination of given same light emitting elements may be used to generate the light activation patterns so that a difference such as fluctuation of image density with respect to other combination can be detected easily. By forming the image patterns for a plurality of times with a same sub-scanning pitch such as d times 40 (d×40), the difference between the latent images conditions and/or image forming conditions among the image patterns formed on photoconductor can be detected easily.

Figure 11:
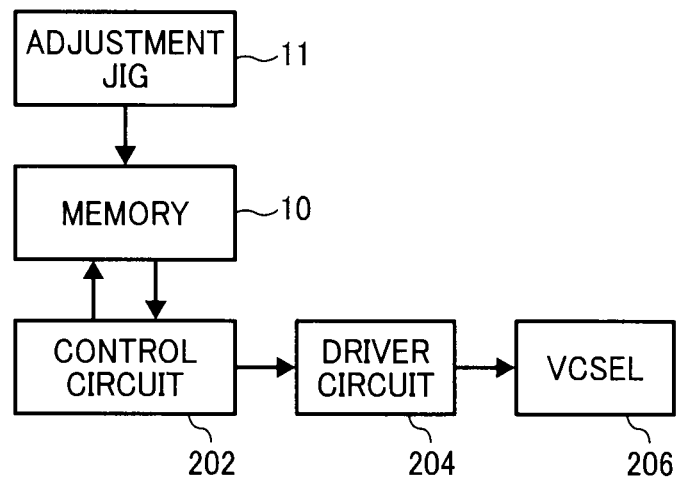
FIG. 11 shows an example block diagram for light intensity adjustment scheme, in which light intensity adjustment value is stored.

FIG. 11 shows an example block diagram of adjustment scheme in an example embodiment, in which light intensity adjustment value may be stored in a memory. When the light intensity adjustment process is conducted, for example, the light activation patterns for measuring light intensity adjustment value (FIG. 10) are formed on the photoconductor as latent images, and the latent images are observed by a microscope or the like. Then, an adjustment jig 11 is used to adjust the second light intensity adjustment value (FIG. 9), and the adjustment value is stored in a non-volatile memory such as a memory 10, in which the adjustment value may be a value to be used to forming latent images with a given same condition such as same image density.

The adjustment value stored in the memory 10 may be loaded to the control circuit 202 before the image forming apparatus is to start an image forming operation, or data stored in the memory 10 can be loaded to the control circuit 202 using another central processing unit or the like. Further, by actually printing an image using the light activation patterns for measuring the light intensity adjustment value by an image forming apparatus, and based on such print result, the second light intensity adjustment value used for the control circuit 202 can be changed or adjusted.

Figure 12:
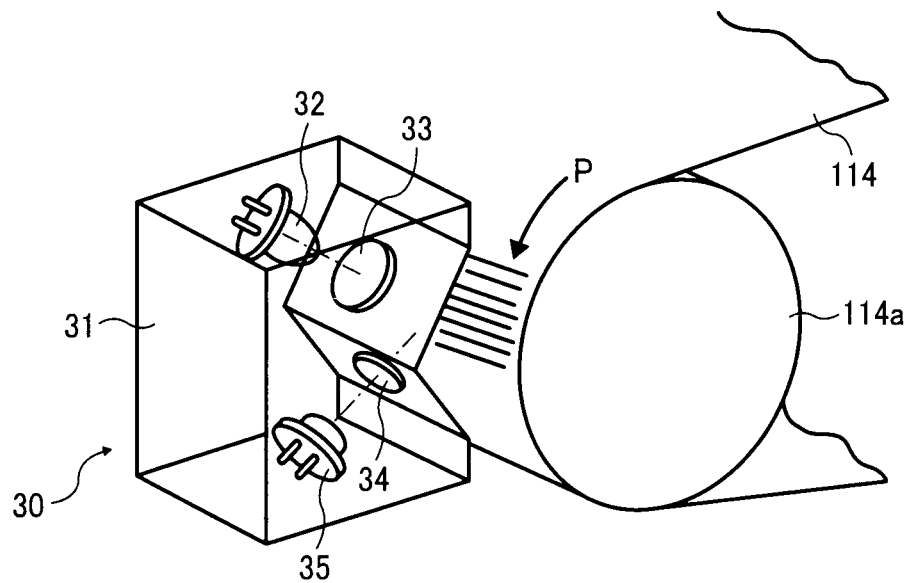
FIG. 12 shows a perspective view of a detection unit to detect light activation patterns for measuring light intensity adjustment value formed on a belt used as a transfer medium.

FIG. 12 shows a perspective view of a detector unit 30 to detect image patterns such as the light activation patterns for measuring light intensity adjustment value formed on the intermediate transfer belt 114 (used as transfer medium). The detector unit 30 has a configuration shown in FIG. 12. As shown in FIG. 1, the intermediate transfer belt 114, used as a transfer medium, may be disposed under and along a plurality of the photoconductor drums 104*a*, 106*a*, 108*a*, 110*a* arranged in tandem.

The detector unit 30 may be disposed near the transport roller 114*a*, which is one of the transport rollers 114*a* to 114*c* shown in FIG. 1 and also used as a drive roller, to read or detect the image pattern P formed on the intermediate transfer belt 114. The detector unit 30 may include a light emitting element 32, a lens 33, a light receiving lens 34, and a light receiving element 35, which may be encased in a casing 31. The light emitting element 32 may be, for example, a light emitting diode (LED). The lens 33 focuses light emitted from the light emitting element 32 to illuminate the surface of the intermediate transfer belt 114. The light receiving lens 34 receives a reflection light reflected from the surface of the intermediate transfer belt 114. The light receiving element 35 may be, for example, a photodiode, which receives the light focused by the light receiving lens 34.

When the image pattern P comes to an area, which can be illuminated by the light emitting element 32, the reflection light is received by the light receiving element 35, in which the detection signal, output from the light receiving element 35, may vary depending on conditions of the image pattern P. As such, the conditions of image pattern P may be detected using the output signal of the light receiving element 35.

Figure 13:
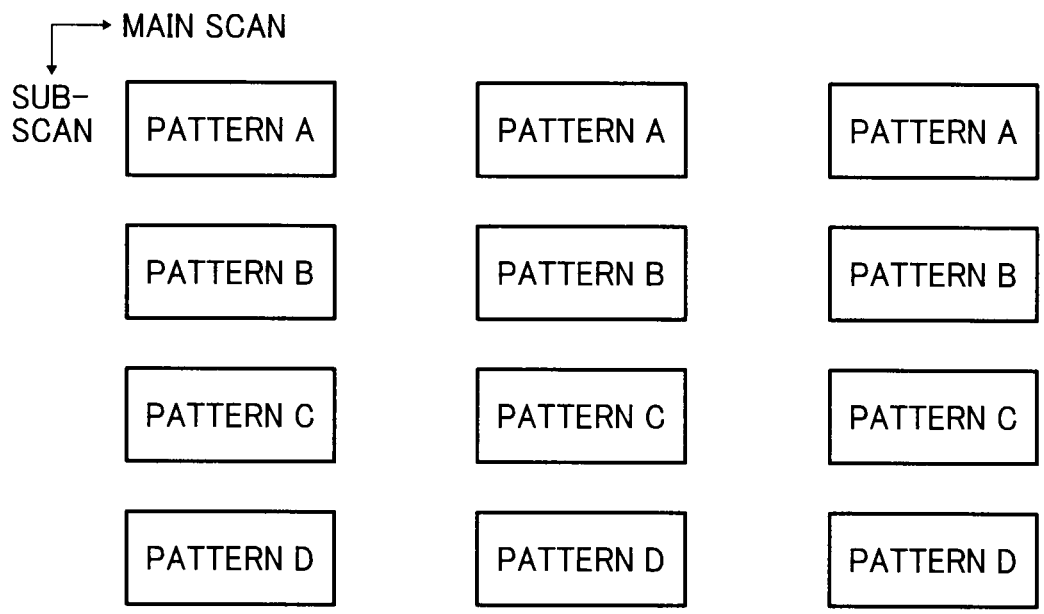
FIG. 13 shows an example layout of image forming patterns composed of light activation patterns for measuring light intensity adjustment value.

FIG. 13 shows an example layout for forming the light activation patterns for measuring light intensity adjustment value. FIG. 10 shows examples of light activation patterns, and FIG. 13 shows one example layout pattern for forming the light activation patterns. In such example case, image patterns A, B, C, and D (hereinafter patterns A, B, C, and D), may be formed as a matrix having, for example, three positions in the main scanning direction and four positions in the sub-scanning direction. A detection unit, which may be the detector unit 30 shown in FIG. 12 or the like, may be disposed at each of the three positions in the main scanning direction (i.e., at both edges and the center in the main scanning direction) to detect the image patterns.

For example, the image patterns A to D of FIG. 13 can be formed as follows using different light emitting elements in the light source.

pattern A: FIG. 10A(a), image forming 6-*a*-3 of FIG. 6
pattern B: FIG. 10A(b), image forming 6-*b*-1 of FIG. 6
pattern C: FIG. 10B(c), image forming 6-*c*-1 of FIG. 6
pattern D: FIG. 10B(d), image forming 6-*a*-1 of FIG. 6

It should be noted that the image patterns can be formed differently. For example, the number of image patterns, image forming position, and the combination patters of image patterns can be changed, as required.

The combination patterns of light emitting elements for generating or forming each of light activation patterns may be set as follows. For example, when the total number of light emitting elements of the light source is set to "n" defined by "n=2m+2," the combination patterns of four light emitting elements to be activated to emit light beams, which are two-dimensionally arrayed, in the sub-scanning direction can be expressed with the following sequence order of channel number (ch No.), wherein n, m, p, α are integers.

combination 1 (pattern D): [p, p+1, n−m+p−1−α, n−m+p−α], in which p≠m+1 and p≤n; as for α, when p>m, α=n, and when p≤m, α=0.

combination 2 (pattern A): [p−1, p, p+1, n], in which p=m+1 and p≤n.

combination 3 (pattern B): [1, p, p+1, n], in which p=m+1 and p≤n.

combination 4 (pattern C): [1, p, p+1, p+2], in which p=m+1 and p≤n.

Hereinafter, examples of combination of light emitting elements for forming the light activation patterns are described.

In case of example 1 of the combination 1: when n=40, m=19, and P=25 (P≠m+1 and p≤n), because of p>m, α=n=40. Accordingly, p=25, p+1=26, n−m+p−1−α=40−19+25−1−40=5, and n−m+p−α=40−19+25−40=6 can be set. Therefore, the light emitting elements to be activated to emit light beams become a combination of ch25, ch5, ch26, and ch6, which corresponds to FIG. 10B(d).

Similarly, in case of example 2 of the combination 1: when n=40, m=19, and P=19 (P≠m+1 and p≤n), because of p≤m, α=0. Accordingly, p=19, p+1=20, n−m+p−1−α=40−19+19−1−0=39, and n−m+p−α=40−19+19−0=40. Therefore, the light emitting elements to be activated to emit light beams become a combination of ch19, ch20, ch39, and ch40.

Similarly, in case of example 3 of the combination 1: when n=20, m=9, P=6 (P≠m+1 and p≤n), because of p≤m, α=0. Accordingly, p=6, p+1=7, n−m+p−1−α=20−9+6−1−0=16, and n−m+p−α=20−9+6−0=17. Therefore, the light emitting elements to be activated to emit light beams become a combination of ch6, ch7, ch16, and ch17.

In case of examples of the combinations 2, 3, and 4: when n=40, m=19, and because of P=m+1=20≤n is set, the followings are set.

combination 2: because p−1=19, p=20, p+1=21, and n=40 are set, light emitting elements to be activated to emit light beams become a combination of ch19, ch20, ch21, and ch40, which corresponds to FIG. 10A(a).

combination 3: because 1, p=20, p+1=21, and n=40 are set, light emitting elements to be activated to emit light beams become a combination of ch1, ch20, ch21, and ch40, which corresponds to FIG. 10A(b).

combination 4: because 1, p=20, p+1=21, and p+2=22 are set, the light emitting elements to be activated to emit light beams become a combination of ch1, ch20, ch21, and ch22, which corresponds to FIG. 10B(c).

Figure 14:
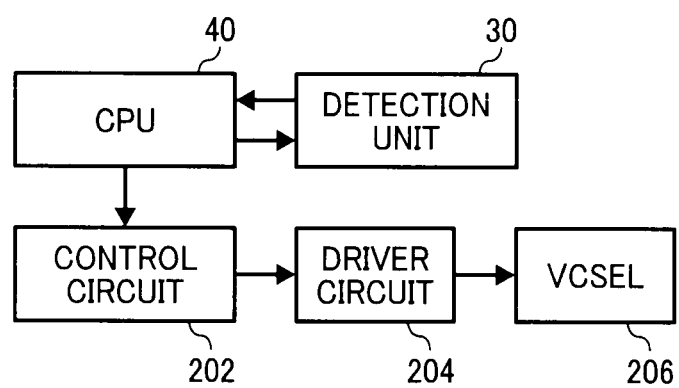
FIG. 14 shows an example block diagram of using a detection result of fluctuation of image density, detected by the light activation patterns for measuring light intensity adjustment value, for setting a second light intensity adjustment value.

FIG. 14 shows an example block diagram of using the result of density detection of image patterns, formed as the light activation patterns, for setting the second light intensity adjustment value. The density of image patterns (FIG. 13) formed by using the light activation patterns can be determined based on the output signals of the detector unit 30 shown in FIG. 12.

In FIG. 14, the output signals of the detector unit 30, detecting each of image patterns (FIG. 13) may be stored in a central processing unit (CPU) 40 as the image density data for each of image patterns. The average value of image density data for each of image patterns A, B, C, D may be referred to as Aave, Bave, Cave, Dave, respectively. The average value Dave, which does not include the effect of light emitting elements ch20 and ch21, may be used as a reference value, and then the second light intensity adjustment value may be adjusted to a given value so that the value of Aave, Bave, Cave can set closer to the Dave using the second light intensity adjustment value. Such second light intensity adjustment value can be set to the control circuit 202 by using the CPU 40.

Such light intensity adjustment operation may be conducted after activating the image forming apparatus or before conducting an image forming operation such as printing. Further, by actually printing an image using the light activation pattern for measuring the light intensity adjustment value, and based on such print result, the second light intensity adjustment value used for the control circuit 202 can be changed and adjusted.

Further, in the above described example embodiment, a vertical cavity surface emitting laser (VCSEL), used as light source, has a number of light emitting elements therein. For example, among the light emitting elements, the light emitting elements such as ch20 and ch21 are adjacently disposed at the center portion in the sub-scanning direction, and the interval between light emitting elements ch20 and ch21 is set narrower than the interval between other light emitting elements disposed at portions other than the center portion in the sub-scanning direction. When such light emitting elements ch20 and ch21 are simultaneously activated to emit light beams, the light intensity of light emitting elements ch20 and ch21 may be adjusted to a smaller value compared to the light intensity of other light emitting elements disposed at portions other than the center portion in the sub-scanning direction. Further, instead of setting a smaller light intensity for both of light emitting elements ch20 and ch21, at least one of the light emitting elements ch20 and ch21 may be adjusted to a smaller light intensity compared to the light intensity of other light emitting elements disposed at portions other than the center portion in the sub-scanning direction in view of image forming conditions.

Further, the VCSEL can be prepared by changing numbers and/or arrangement patterns of light emitting elements. For example, if the numbers and arrangement patterns of light emitting elements is changed, the number of light emitting elements adjacently disposed at the center portion in the sub-scanning direction may be changed, wherein the interval between the adjacently disposed light emitting elements is set narrower than the interval between other light emitting elements disposed at portions other than the center portion in the sub-scanning direction. Such light emitting elements adjacently disposed at the center portion in the sub-scanning direction may not be limited one pair of light emitting elements, but a plurality of pairs of light emitting elements can be set as light emitting elements adjacently disposed at the center portion in the sub-scanning direction. When such light emitting elements are activated to emit light beams simultaneously, the light intensity of at least one light emitting element in one pair disposed at the center portion in the sub-scanning direction may be adjusted smaller than the light intensity of other light emitting elements not disposed at the center portion in the sub-scanning direction.

Figure 15:
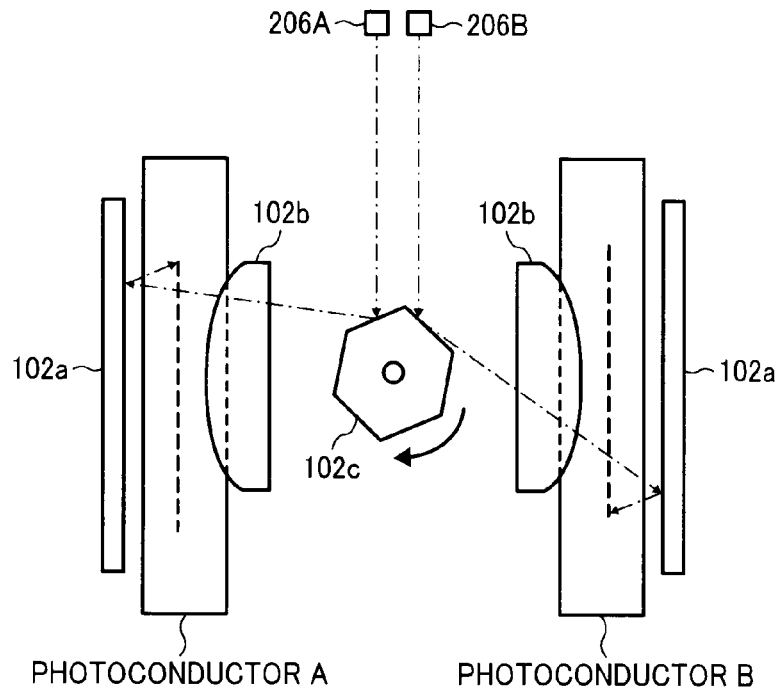
FIG. 15 shows one example plan view of an optical unit and photoconductor used for an image forming apparatus including a light source for each of color images.

FIG. 15 shows an example plan view of an optical unit and photoconductors used for an image forming apparatus including a plurality of light sources, which may be corresponded for each of color images. The image forming apparatus may employ an counter scan system, in which one vertical cavity surface emitting laser (VCSEL) 206A is used for two colors, and another vertical cavity surface emitting laser (VCSEL) 206B is used for another two colors, and a deflecting element such as polygon mirror 102c is used for both of the VCSEL 206A and VCSEL 206B. Further, FIG. 15 shows a pair of f-theta lens 102b, a pair of mirrors 102a, and a pair of photoconductors A and B.

Figure 16:
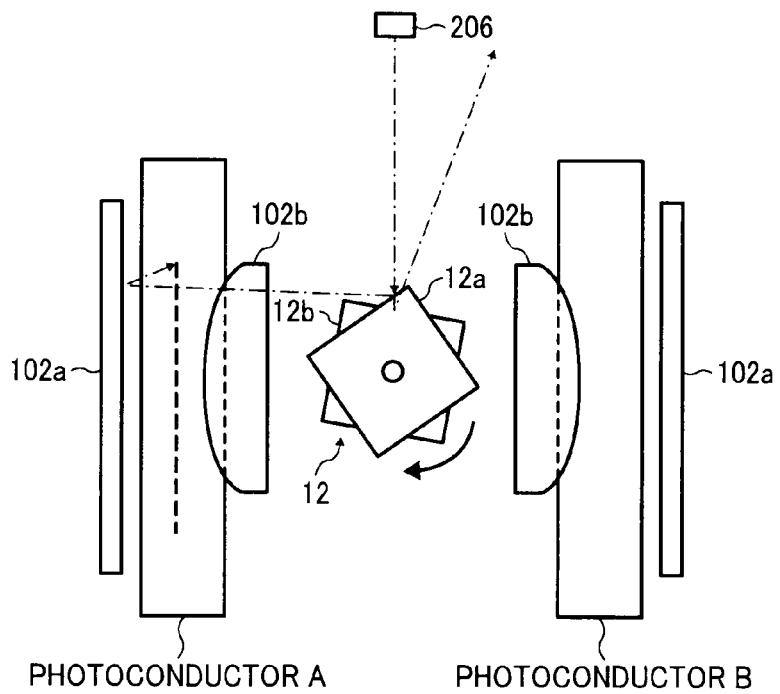
FIG. 16 shows another example plan view of an optical unit and photoconductor used for an image forming apparatus including a common light source for a plurality of color images.

FIG. 16 shows another example plan view of an optical unit and photoconductors used for an image forming apparatus including a common light source for a plurality of colors. FIG. 16 shows an image forming apparatus employing a counter scan system, which may include a light source such as one vertical cavity surface emitting laser (VCSEL) 206, which is a common light source for a plurality of color images, and a deflecting element such as a polygon mirror 12. The polygon mirror 12 includes an upper polygon mirror 12a used for the photoconductor A, and a lower polygon mirror 12b used for the photoconductor B (two stage construction), and each mirror face of polygon mirror 12 corresponds to each of image colors. For example, when a laser beam deflected by the upper polygon mirror 12a forms a latent image on the photoconductor A, a laser beam deflected by the lower polygon mirror 12b does not irradiate the photoconductor B.

In the above described example embodiment, an indirect-transfer type color image forming apparatus uses an intermediate transfer belt as a transfer medium and employs a tandem type configuration, but the image forming apparatus is not limited thereto. For example, the above described example embodiment can be applied to a direct-transfer type color image forming apparatus which directly transfer each of color images to a transfer sheet, and further, the above described example embodiment can be applied to a single color image forming apparatus using for example white/black color, in which the transfer sheet is used as the transfer medium.

The above described example embodiment can be applied to image forming apparatuses using electrophotography and multi-beam writing such as copiers, printers, facsimile machines, digital multi-functional machines, which may form a two-dimensional electrostatic latent image by using an interlace scanning process. The above described example embodiment can be applied to an image forming apparatus when one pixel is written using a plurality of light beams emitted from a plurality of light emitting elements included in a light source while setting the writing resolution level higher than the raster resolution level.

In the above described embodiment, a light source has a plurality of light source elements, and the interval or pitch of light emitting elements at the center portion in the sub-scanning direction is set narrower than the interval or pitch of light emitting elements at other portions in the sub-scanning direction. When the interlace scan (i.e., writing) is conducted using such light source, the light intensity can be adjusted not to cause uneven image density in image, by which banding can be reduced, in particularly eliminated.

In the above described embodiment, the light intensity at the center portion in the sub-scanning direction may be adjusted to form an image at a desired resolution level without uneven image density.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:
1. An image forming apparatus, comprising:
a photoconductor;
a charger to 1charge a surface of the photoconductor;
a multi-beam scanning unit including:
a vertical cavity surface emitting laser as a light source having a plurality of light emitting elements two-dimensionally arrayed in a main scanning direction and a sub-scanning direction perpendicular to the main scanning direction and arranged so that an interval between light emitting elements adjacently disposed at a center portion of the scanning unit in the sub-scanning direction is set narrower than an interval between other light emitting elements adjacently disposed at other portions of the scanning unit in the sub-scanning direction;
a deflecting element to deflect a plurality of light beams emitted from each of the plurality of light emitting elements to scan and expose the charged surface of the photoconductor to write a two-dimensional electrostatic latent image on the photoconductor by conducting an interlace scan on the photoconductor in the main scanning direction and the sub-scanning direction perpendicular to the main scanning direction while the surface of photoconductor is moving in the sub-scanning direction; and
a light intensity adjustment unit to adjust a light intensity of at least one of the light emitting elements adjacently disposed at the center portion in the sub-scanning direction relative to a light intensity of other light emitting elements adjacently disposed at other portions in the sub-scanning direction, and when only one of the light emitting elements adjacently disposed at the center portion in the sub-scanning direction is activated to emit light in a single scanning of a scan line the light intensity adjustment unit sets a light intensity of the one of the light emitting elements adjacently disposed at the center portion in the sub-scanning direction that is activated to be the same as a light intensity of other light emitting elements disposed at other portions in the sub-scanning direction;
a development unit to develop the electrostatic latent image, using a development agent, formed on the surface of the photoconductor; and
a transfer unit to transfer the image developed on the surface of the photoconductor by the development unit to a transfer medium,
wherein the light beams are emitted from a given number of the light emitting elements of the light source to write an image of one pixel while setting a writing resolution level that is higher than a raster resolution level, and
wherein the light intensity adjustment unit includes a flip flop circuit and a digital/analog converter.

2. The image forming apparatus of claim 1, wherein the interval between light emitting elements adjacently disposed at the center portion in the sub-scanning direction is half the interval between other light emitting elements adjacently disposed at other portions in the sub-scanning direction.

3. The image forming apparatus of claim 1, wherein when the writing resolution level is 4800 dots per inch (dpi) and the raster resolution level is 1200 dots per inch (dpi), in which one pixel is written using four light beams emitted from four light emitting elements of the light source.

4. The image forming apparatus of claim 1, wherein when two adjacent light emitting elements disposed at the center portion in the sub-scanning direction are simultaneously activated to emit light beams, the light intensity adjustment unit sets a light intensity of at least one of the two light emitting elements smaller than a light intensity of other light emitting elements disposed at other portions in the sub-scanning direction.

5. The image forming apparatus of claim 1, further comprising:
  a detector to detect an image pattern formed on the transfer medium; and
  a storage unit to store an output signal of the detector as image density data for each light activation pattern used for measuring light intensity adjustment value,
  wherein the multi-beam scanning unit writes an image pattern on the transfer medium that corresponds to a light activation pattern used for measuring light intensity adjustment value formed by using a plurality of light emitting elements selected from among the light emitting elements disposed in the light source to emit a plurality of light beams to form the image pattern, and
  the light intensity adjustment unit adjusts the light intensity of the light emitting elements using the image density data stored in the storage unit.

6. The image forming apparatus of claim 5, wherein the light activation pattern used for measuring light intensity adjustment value includes a first light activation pattern used for measuring light intensity adjustment value and a second light activation pattern used for measuring light intensity adjustment value,
  the first light activation pattern used for measuring light intensity adjustment value is formed by selecting a plurality of light emitting elements by including the light emitting elements adjacently disposed at the center portion in the sub-scanning direction using a simultaneous scanning and exposing process,
  the second light activation pattern used for measuring light intensity adjustment value is formed by selecting a plurality of light emitting elements, without including the light emitting elements adjacently disposed at the center portion in the sub-scanning direction in a way that the light emitting elements adjacently disposed at the center portion in the sub-scanning direction are not used for a simultaneous scanning and exposing process, and
  the light intensity adjustment unit adjusts image density data corresponding to the first light activation pattern, stored in the storage unit, closer to image density data corresponding to the second light activation pattern to adjust the light intensity.

7. The image forming apparatus of claim 6, wherein when the number of light emitting elements in the light source is "n", where n=2m+2,
  a combination of four light emitting elements, to be activated to emit light beams for forming the second light activation pattern, has a following sequence order in the sub-scanning direction defined by a combination 1, and
  combinations of four light emitting elements, to be activated to emit light beams for the first light activation pattern, have a following sequence order in the sub-scanning direction defined by any one of combinations 2, 3, and 4, in which n, m, p, $\alpha$ are integers,
  combination 1: [p, p+1, n−m+p−1−$\alpha$, n−m+p−$\alpha$] in which p≠m+1 and p ≤n; as for $\alpha$, when p >m, $\alpha$=n, and when p ≤m, $\alpha$=0,
  combination 2: [p−1, p, p+1, n] in which p=m+1 and p≤n,
  combination 3: [1, p, p+1, n] in which p=m+1 and p≤n,
  combination 4: [1, p, p+1, p+2] in which p=m+1 and p≤n.

8. The image forming apparatus of claim 7, wherein the first light activation pattern includes three types defined by the combinations 2, 3, and 4 to activate light emitting elements to emit light, and
  the light intensity adjustment unit adjusts each image density data corresponding to the first light activation pattern, stored in the storage unit, closer to image density data corresponding to the second light activation pattern to adjust the light intensity.

9. The image forming apparatus of claim 1, wherein the image forming apparatus is a tandem type color image forming apparatus to form a plurality of color images on a plurality of photoconductors and to transfer the plurality of color images to the transfer medium sequentially and superimposingly.

10. The image forming apparatus of claim 9, wherein the multi-beam scanning unit includes the light source for each of color images.

11. The image forming apparatus of claim 9, wherein the multi-beam scanning unit includes a common light source for at least two different color images.

12. An image forming apparatus, comprising:
  a photoconductor;
  a charger to charge a surface of the photoconductor;
  means for multi-beam scanning including a light source having a plurality of light emitting elements and a deflecting element to deflect a plurality of light beams emitted from each of the plurality of light emitting elements to scan and expose the charged surface of the photoconductor to write a two-dimensional electrostatic latent image on the photoconductor by conducting an interlace scan on the photoconductor in a main scanning direction and the sub-scanning direction while the surface of the photoconductor is moving in a sub-scanning direction perpendicular to the main scanning direction;
  means for adjusting light intensity of light emitting elements adjacently disposed at a center portion of the light source in the sub-scanning direction relative to a light intensity of other light emitting elements adjacently disposed at other portions in the sub-scanning direction and for setting a light intensity of one of the light emitting elements adjacently disposed at the center portion of the light source in the sub-scanning direction to be the same as a light intensity of other light emitting elements disposed at other portions in the sub-scanning direction when the one of the light emitting elements is the only light emitting element of the light emitting elements adjacently disposed at the center portion in the sub-scanning direction activated to emit light in a single scanning of a scan line;

a development unit to develop the electrostatic latent image, using a development agent, formed on the surface of the photoconductor; and a transfer unit to transfer the image developed on the surface of the photoconductor by the development unit to a transfer medium, wherein the means for adjusting light intensity includes a flip flop circuit and a digital/analog converter.

13. The image forming apparatus according to claim 12, wherein the light beams are emitted from a given number of the light emitting elements of the light source is used to write an image of one pixel while setting a writing resolution level is higher than a raster resolution level, and the light source is a vertical cavity surface emitting laser having the plurality of light emitting elements two-dimensionally arrayed in the main scanning direction and the sub-scanning direction so that, when the plurality of light emitting elements is projected onto a virtual line extending in the sub-scanning direction, an interval between light emitting elements adjacently disposed at the center portion in the sub-scanning direction is set narrower than an interval between other light emitting elements adjacently disposed at other portion in the sub-scanning direction.

14. An image forming apparatus, comprising:

a photoconductor;

a charger to charge a surface of the photoconductor;

a multi-beam scanning unit including:

a vertical cavity surface emitting laser as a light source having a plurality of light emitting elements two-dimensionally arrayed in a main scanning direction and a sub-scanning direction perpendicular to the main scanning direction and arranged so that an interval between light emitting elements adjacently disposed at a center portion of the scanning unit in the sub-scanning direction is set narrower than an interval between other light emitting elements adjacently disposed at other portions of the scanning unit in the sub-scanning direction;

a deflecting element to deflect a plurality of light beams emitted from each of the plurality of light emitting elements to scan and expose the charged surface of the photoconductor to write a two-dimensional electrostatic latent image on the photoconductor by conducting an interlace scan on the photoconductor in the main scanning direction and the sub-scanning direction perpendicular to the main scanning direction while the surface of photoconductor is moving in the sub-scanning direction; and a light intensity adjustment unit to adjust a light intensity of at least one of the light emitting elements adjacently disposed at the center portion in the sub-scanning direction relative to a light intensity of other light emitting elements adjacently disposed at other portions in the sub-scanning direction and relative to an activation state of an other of the light emitting elements adjacently disposed at the center portion in the sub-scanning direction;

a development unit to develop the electrostatic latent image, using a development agent, formed on the surface of the photoconductor; and a transfer unit to transfer the image developed on the surface of the photoconductor b) the development unit to a transfer medium, wherein the light beams are emitted from a given number of the light emitting elements of the light source to write an image of one pixel while setting a writing resolution level that is higher than a raster resolution level, and wherein the light intensity adjustment unit includes a flip flop circuit and a digital/analog converter.

* * * * *